United States Patent
Choi et al.

(10) Patent No.: US 8,785,040 B2
(45) Date of Patent: Jul. 22, 2014

(54) POSITIVE ELECTRODE FOR RECHARGEABLE LITHIUM BATTERY, METHOD FOR MANUFACTURING THE SAME, AND RECHARGEABLE LITHIUM BATTERY INCLUDING THE SAME

(75) Inventors: Nam-Soon Choi, Yongin-si (KR); Sae-Weon Roh, Yongin-si (KR); Yong-Chul Park, Yongin-si (KR); Sung-Soo Kim, Yongin-si (KR); So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 331 days.

(21) Appl. No.: 12/886,778

(22) Filed: Sep. 21, 2010

(65) Prior Publication Data
US 2011/0123864 A1 May 26, 2011

(30) Foreign Application Priority Data
Nov. 23, 2009 (KR) .................. 10-2009-0113416

(51) Int. Cl.
*H01M 4/02* (2006.01)

(52) U.S. Cl.
USPC ............ 429/209; 429/231.9; 429/231.95; 429/232; 429/241

(58) Field of Classification Search
CPC .............. H01M 2300/0094; H01M 4/382; H01M 2004/028; H01M 4/04; H01M 4/0404; H01M 4/1391
USPC ............ 429/209, 231.9, 231.95, 232, 241
See application file for complete search history.

(56) References Cited

U.S. PATENT DOCUMENTS

| | | | |
|---|---|---|---|
| 6,190,803 B1 * | 2/2001 | Tomiyama et al. | 429/245 |
| 6,263,256 B1 | 7/2001 | Zheng | |
| 6,268,087 B1 | 7/2001 | Kim et al. | |
| 6,489,058 B1 * | 12/2002 | Weckesser et al. | 429/223 |
| 2003/0073000 A1 * | 4/2003 | Lee et al. | 429/218.1 |
| 2005/0100784 A1 | 5/2005 | Yageta et al. | |
| 2006/0137157 A1 | 6/2006 | Itagawa et al. | |

FOREIGN PATENT DOCUMENTS

| | | |
|---|---|---|
| JP | 2000-051555 | 2/2000 |
| KR | 10-1999-016509 | 3/1999 |
| KR | 1999-0051073 | 7/1999 |
| KR | 10-2001-0003240 | 1/2001 |
| KR | 10-2001-0107374 | 12/2001 |
| KR | 10-2004-0096381 | 11/2004 |
| KR | 10-2005-0043660 | 5/2005 |
| KR | 10-2005-0090748 | 9/2005 |
| KR | 10-2005-0098886 | 10/2005 |
| KR | 10-2006-0015060 | 2/2006 |

OTHER PUBLICATIONS

KIPO Notice of Allowance dated Jun. 27, 2011, for Korean priority Patent application 10-2009-0113416, noting listed references in this IDS.

Korean Patent Abstracts for Korean Patent 10-0289062 B1, dated Feb. 14, 2011, corresponding to Korean publication 1999-0051073 listed above.

* cited by examiner

*Primary Examiner* — Jane Rhee
(74) *Attorney, Agent, or Firm* — Christie, Parker & Hale, LLP (57) ABSTRACT

A positive electrode for a rechargeable lithium battery including a net-type current collector and a positive active material layer formed on both sides of the current collector and also including a positive active material and a binder and having a thickness of about 150 μm or more, a method of manufacturing the same, and a rechargeable lithium battery including the same.

23 Claims, 5 Drawing Sheets

POSITIVE ELECTRODE FOR RECHARGEABLE LITHIUM BATTERY, METHOD FOR MANUFACTURING THE SAME, AND RECHARGEABLE LITHIUM BATTERY INCLUDING THE SAME

CROSS-REFERENCE TO RELATED APPLICATIONS

This application claims the benefit of Korean Application No. 10-2009-0113416, filed Nov. 23, 2009 in the Korean Intellectual Property Office, the disclosure of which is incorporated herein by reference.

BACKGROUND

1. Field

Aspects of this invention relate to a positive electrode for a rechargeable lithium battery, a method of manufacturing the same, and a rechargeable lithium battery including the same.

2. Description of the Related Art

A battery is a device for converting chemical energy generated during electrochemical oxidation-reduction of chemical materials thereinside into electrical energy. A battery can be classified either as a primary battery that can only be discarded when its energy is used up or a rechargeable battery that can be re-charged several times. The rechargeable battery can be charged and discharged several times by using reversible mutual conversion of chemical energy and electrical energy.

In addition, as electronic equipment is becoming smaller and lighter due to developments of the electronic industry, portable electronic devices are increasingly being used. Accordingly, a battery with high energy density is required as a power source for the portable electronic devices, and thus active research on a rechargeable lithium battery is being undertaken.

A rechargeable lithium battery is used by injecting an electrolyte into a battery cell including a positive electrode including a positive active material that can intercalate and deintercalate lithium and a negative electrode including a negative active material that can intercalate and deintercalate lithium.

On the other hand, in order to have a large capacity battery the positive and negative electrodes are required to be thick. However, when they are formed to be thick, they may develop cracks on the surface thereof. Then, they may have poor conductivity, which may have a negative influence on performance of a rechargeable lithium battery.

SUMMARY

One embodiment of the present invention provides an excellent positive electrode for a rechargeable lithium battery by minimizing cracks on the surface thereof.

Another embodiment of the present invention provides a method of manufacturing the positive electrode for a rechargeable lithium battery.

Yet another embodiment of the present invention provides a rechargeable lithium battery including the positive electrode.

According to one embodiment of the present invention, a positive electrode for a rechargeable lithium battery includes a net-type current collector with a positive active material layer formed on both sides of the current collector where the positive active material layer includes a positive active material and a binder, and the positive electrode is about 150 μm thick or more.

According to another embodiment of the present invention, a method of manufacturing the positive electrode provides preparing a positive active material layer including a positive active material and a binder, disposing the positive active material layer on both sides of a net-type current collector, and hot-pressing the positive active material layer and the current collector. The positive electrode is about 150 μm thick or more.

According to still another embodiment of the present invention, a rechargeable lithium battery includes a positive electrode, a negative electrode, and a separator disposed between the positive and negative electrodes. The positive electrode includes a net-type current collector and a positive active material layer formed on both sides of the current collector where the positive active material layer includes a positive active material and a binder, and the positive electrode is about 150 μm thick or more.

The current collector may be made of aluminum.

The positive active material layer may include 80 to 95 wt % of the positive active material and 5 to 20 wt % of the binder.

The positive active material may be selected from the group consisting of $LiCoO_2$, $LiMn_2O_4$, $LiFePO_4$, and a combination thereof.

The binder may include a first binder including polyvinylidene fluoride, and a second binder selected from the group consisting of polyvinyl acetate, polymethylmethacrylate, polyethylene oxide, polyvinyl chloride, and a copolymer thereof.

The first binder may be selected from the group consisting of polyvinylidene fluoride, a polyvinylidene fluoride-hexafluoropropylene copolymer, a polyvinylidene fluoride-trifluoroethylene phosphate copolymer, and a combination thereof. The polyvinylidene fluoride-hexafluoropropylene copolymer may include 4 to 20 wt % of hexafluoropropylene. The second binder may be selected from the group consisting of polyvinyl acetate, polymethylmethacrylate, a polymethylmethacrylate-ethylmethacrylate copolymer, a polymethylmethacrylate-butylmethacrylate copolymer, polyethylene oxide, polyethylene glycol-grafted polymethylmethacrylate, polyvinyl chloride, a polyvinyl chloride-methylmethacrylate copolymer, and a combination thereof.

The binder may include 50 to 99 wt % of the first binder and 1 to 50 wt % of the second binder.

The positive active material layer may further include a conductive material, and includes 65 to 85 wt % of the positive active material, 5 to 20 wt % of the binder, and 5 to 10 wt % of the conductive material.

The positive electrode for a rechargeable lithium battery may have a thickness ranging from about 150 to about 2000 μm, and in particular, from 150 to about 1000 μm.

It may have average porosity of 30 volume % or more.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
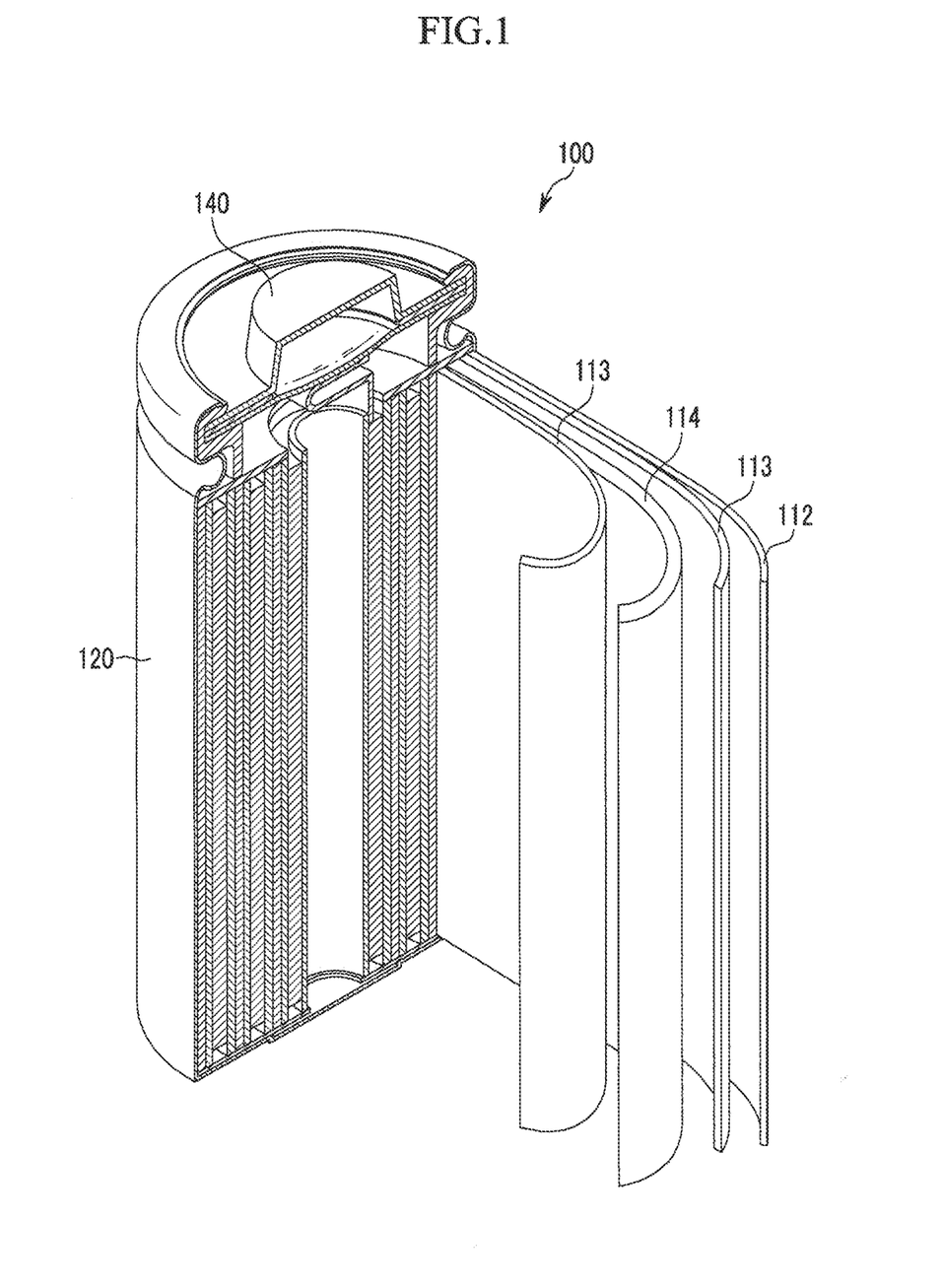
FIG. 1 is a schematic diagram of a rechargeable lithium battery according to one embodiment of the present invention.
Figure 2:
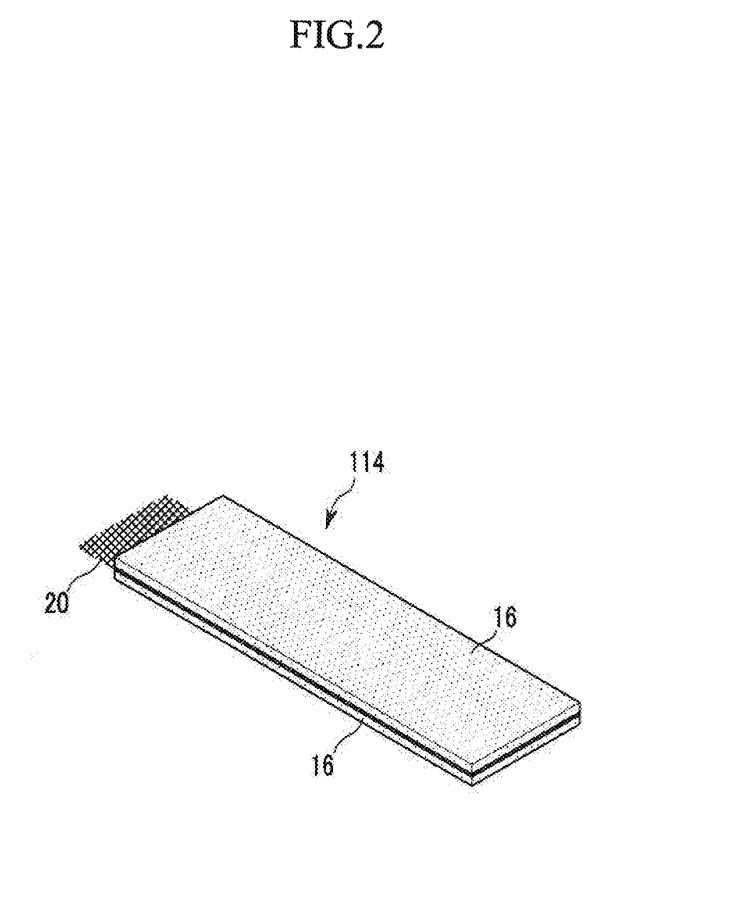
FIG. 2 is a schematic diagram showing the positive electrode of FIG. 1.
Figure 3:
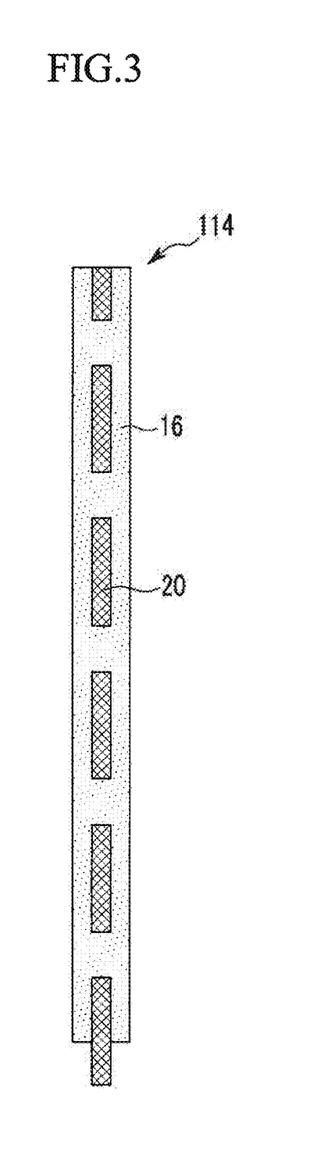
FIG. 3 is a cross-sectional view showing the positive electrode of FIG. 2.

Referring to FIGS. 1 to 3, a positive electrode and a rechargeable lithium battery including the same according to one embodiment of the present invention are illustrated. FIG. 1 is a schematic diagram showing a rechargeable lithium battery according to the embodiment, FIG. 2 is a schematic diagram showing a positive electrode for the rechargeable lithium battery of FIG. 2, and FIG. 3 is a cross-sectional view showing the positive electrode of FIG. 2.

Referring to FIG. 1, a rechargeable lithium battery 100 according to this embodiment includes a positive electrode 114, a negative electrode 112 facing the positive electrode 114, a separator 113 disposed between the positive and negative electrodes 114 and 112, a battery cell including an electrolyte solution (not shown) impregnating the positive and negative electrodes 114 and 112 and the separator 113, a container 120 housing the battery cell, and a member 140 sealing the container 120.

FIGS. 2 and 3 illustrate the positive electrode 114 The positive electrode 114 includes a current collector 20 and a positive active material layer 16 formed on both sides of the current collector 20.

The current collector 20 is a mesh-like net, and may be made of aluminum (Al) or the like. When the current collector 20 is formed as a net it has a decreased thickness, which can allow more positive active material 16 to be loaded inside of the positive electrode 114 of any particular thickness. In addition, the positive active material layer 16 may be more strongly adhered to both sides of the current collector 20 to prevent separation or cracks thereof, improving battery performance. The positive active material layer 16 may include a positive active material and a binder.

The positive active material may include any compound that can reversibly intercalate and deintercalate lithium without particular limit, and in particular, composite oxides of a metal selected from the group consisting of lithium (Li), cobalt (Co), manganese (Mn), nickel (Ni), iron (Fe), and a combination thereof.

Examples of the compounds includes $Li_aA_{1-b}D_bE_2$ (wherein $0.90 \le a \le 1.8$ and $0 \le b \le 0.5$); $Li_aG_{1-b}D_bO_{2-c}J_c$ (wherein $0.90 \le a \le 1.8$, $0 \le b \le 0.5$, and $0 \le c \le 0.05$); $LiG_{2-b}D_bO_{4-c}J_c$ (wherein $0 \le b \le 0.5$ and $0 \le c \le 0.05$); $Li_aNi_{1-b-c}Co_bD_cE_\alpha$ (wherein $0.90 \le a \le 1.8$, $0 \le b \le 0.5$, $0 \le c \le 0.05$, and $0 < \alpha \le 2$); $Li_aNi_{1-b-c}Co_bD_cO_{2-\alpha}J_\alpha$ (wherein $0.90 \le a \le 1.8$, $0 \le b \le 0.5$, $0 \le c \le 0.05$, and $0 < \alpha < 2$); $Li_aNi_{1-b-c}Co_bD_cO_{2-\alpha}J_2$ (wherein $0.90 \le a \le 1.8$, $0 \le b \le 0.5$, $0 \le c \le 0.05$, and $0 < \alpha < 2$); $Li_aNi_{1-b-c}Mn_bD_cE_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bD_cO_{2-\alpha}J_\alpha$ (wherein $0.90 \le a \le 1.8$, $0 \le b \le 0.5$, $0 \le c \le 0.05$, and $0 < \alpha < 2$); $Li_aNi_{1-b-c}Mn_bD_cO_{2-\alpha}J_2$ (wherein $0.90 \le a \le 1.8$, $0 \le b \le 0.5$, $0 \le c \le 0.05$, and $0 < \alpha < 2$); $Li_aNi_bG_cL_dO_2$ (wherein $0.90 \le a \le 1.8$, $0 \le b \le 0.9$, $0 \le c \le 0.5$, and $0.001 \le d \le 0.1$); $Li_aNi_bCo_cMn_dL_eO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiL_bO_2$ (wherein $0.90 \le a \le 1.8$ and $0.001 \le b \le 0.1$); $Li_aCoL_bO_2$ (wherein $0.90 \le a \le 1.8$ and $0.001 \le b \le 0.1$); $Li_aMnL_bO_2$ (wherein $0.90 \le a \le 1.8$ and $0.001 \le b \le 0.1$); $Li_aMn_2L_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiRO_2$; $LiNiVO_4$; $Li_{3-f}Z_2(PO_4)_3$ (wherein $0 \le f \le 2$); $Li_{3-f}Fe_2(PO_4)_3$ (wherein $0 \le f \le 2$); and $LiFePO_4$.

In the above formulas, A is selected from the group consisting of Ni, Co, Mn, and a combination thereof; D is selected from the group consisting of Al, Ni, Co, Mn, Cr, Fe, Mg, Sr, V, a rare earth element, and a combination thereof; E is selected from the group consisting of O, F, S, P, and a combination thereof; G is selected from the group consisting of Co, Mn, and a combination thereof; J is selected from the group consisting of F, S, P, and a combination thereof; L is Al, Cr, Mn, Fe, Mg, La, Ce, Sr, V, and a combination thereof; Q is selected from the group consisting of Ti, Mo, Mn, and a combination thereof; R is selected from the group consisting of Cr, V, Fe, Sc, Y, and a combination thereof; and Z is selected from the group consisting of V, Cr, Mn, Co, Ni, Cu, and a combination thereof. Examples of the positive active material may be selected from the group consisting of $LiCoO_2$, $LiMn_2O_4$, $LiFePO_4$, and a combination thereof.

The binder plays a role of adhering the positive active material firmly to the current collector 20 as well as promoting agglomeration among positive active material particles. It does not influence the chemical characteristics of the positive active material, but promotes adherence and includes first and second binders differing from each other.

The first binder includes polyvinylidene fluoride and may be selected from the group consisting of polyvinylidene fluoride, a polyvinylidene fluoride-hexafluoropropylene copolymer, a polyvinylidene fluoride-trifluoroethylene phosphate copolymer, and a combination thereof, and in particular, may include a polyvinylidene fluoride-hexafluoropropylene copolymer. The polyvinylidene fluoride-hexafluoropropylene copolymer may include about 4 to about 20 wt % of hexafluoropropylene. When it is included within the range, it may improve adherence of a positive active material.

The second binder may be selected from the group consisting of polyvinyl acetate, polymethylmethacrylate, polyethylene oxide, polyvinyl chloride, and a copolymer thereof, and for example, from the group consisting of polyvinyl acetate, polymethylmethacrylate, a polymethylmethacrylate-ethylmethacrylate copolymer, a polymethylmethacrylate-butylmethacrylate copolymer, polyethylene oxide, polyethylene glycol-grafted polymethylmethacrylate, polyvinyl chloride, a polyvinyl chloride-methylmethacrylate copolymer, and a combination thereof, and in particular, polyvinyl acetate, polymethylmethacrylate, polyvinyl chloride, and the like.

The binder may include the first binder in an amount of about 50 to about 99 wt and the second binder in an amount of about 1 to about 50 wt %. When they are included within these ratios, the second binder may overcome the low electrolyte solution affinity of the first binder, thereby improving the electrolyte replacement characteristic in the positive electrode 114.

The positive active material layer 16 may include the positive active material in an amount of about 80 to about 95 wt % and the binder in an amount of about 5 to about 20 wt %.

When the positive active material and the binder are included within these ratios, it may be easy to prepare the positive active material layer as a free standing film.

The positive active material layer 16 may further include a conductive material other than the positive active material and the binder. The conductive material is used to provide conductivity to the positive electrode, and may include any material that does not influence chemical characteristics of the positive active material but has conductivity.

Examples of the conductive material may include a metal powder and a metal fiber such as a polyphenylene derivative, natural graphite, artificial graphite, carbon black, acetylene black, ketjen black, carbon fiber, copper, nickel, aluminum, silver, and the like, and in particular, may be selected from the group consisting of acetylene black, ketjen black, carbon fiber, and a combination thereof.

When the positive active material layer 16 includes a positive active material, a binder, and a conductive material, it may include the positive active material in an amount of about 65 to about 85 wt %, the binder in an amount of about 5 to about 20 wt %, and the conductive material in an amount of about 5 to about 10 wt %. When the positive active material, the binder, and the conductive material are included within these ratios, they may bring about excellent electrical conductivity in the positive electrode 114.

As aforementioned, the positive electrode 114 may be about 150 μm thick or more, in particular, about 150 to about 2000 μm thick, and more particularly, about 150 to about 1000 μm thick. When it has a thickness within the range, the battery may have a large capacity.

The positive electrode 114 may have average porosity of about 30 volume % or more. Herein, the average porosity indicates the total pore volume ratio inside the positive electrode 114 and can be calculated by a mercury porosimetry method. The average porosity can be adjusted by the compression rate of the positive electrode 114. When it is more than 30 volume %, the positive electrode 114 may have a larger impregnation region for an electrolyte, and thus more active oxidation and reduction of lithium in the electrode, creating a stable cycle-life characteristic for a long term. On the other hand, the average porosity may be in a range of about 30 to about 50 volume % in order to provide high efficiency charge and discharge characteristics and securing them by stably maintaining an electrical network among positive active materials as well as secure oxidation and reduction of lithium and stable cycle-life characteristics.

Figure 4:
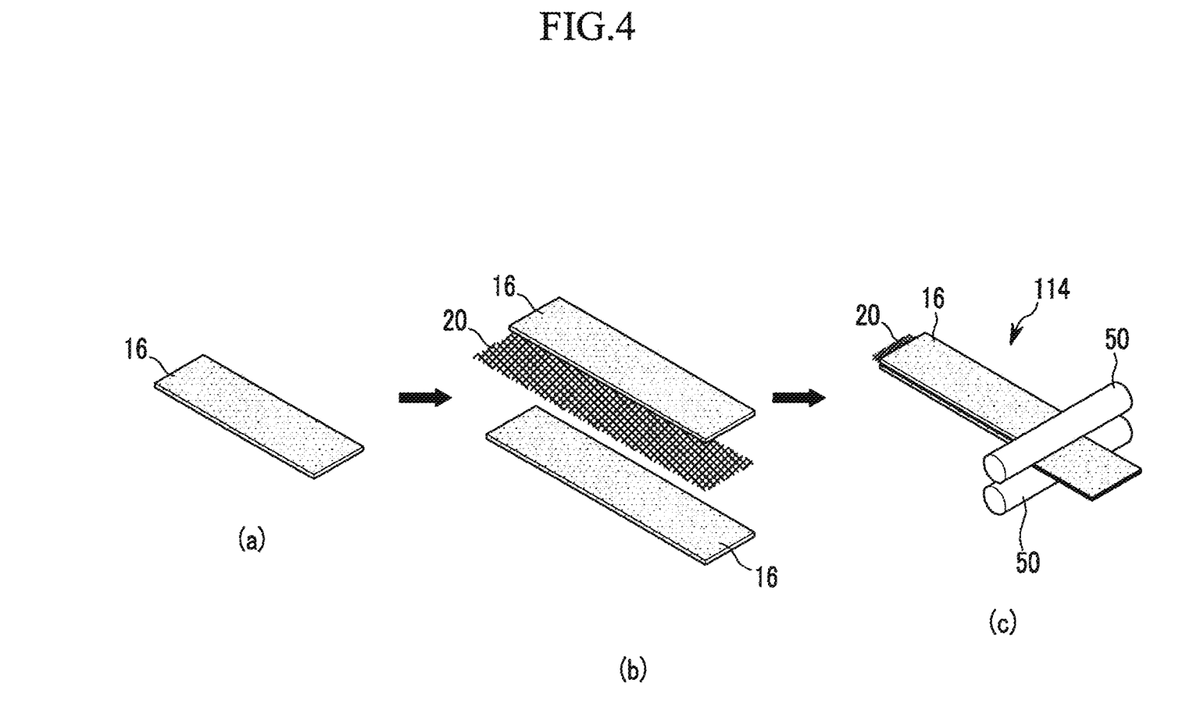
FIG. 4 is a schematic diagram showing a method of manufacturing the positive electrode for a rechargeable lithium battery according to one embodiment of the present invention.

FIG. 4 is a schematic diagram showing a method of manufacturing a positive electrode for a rechargeable lithium battery according to one embodiment of the present invention. First of all, a composition for a positive active material layer 16 including a positive active material, a binder, and optionally a conductive material is prepared. The composition may be prepared as a slurry.

Referring to (a) of FIG. 4, a positive active material layer 16 is prepared by coating the composition for a positive active material layer 16 on a plate made of an inorganic material such as glass and the like, or an organic material such as polytetrafluoroethylene (PTFE) and the like (not shown). Referring to (b) of FIG. 4, the positive active material layer 16 is disposed on both sides of a mesh-like net-type current collector 20. Referring to (c) of FIG. 4, the current collector 20 and the positive active material layer 16 are hot-pressed from both top and bottom at a predetermined temperature with a compressor 50 such as a roller. The hot-pressure is performed at a temperature ranging from about 150 to about 170° C., and pressed more than two times if needed.

When a positive active material layer 16 is disposed on both sides of a current collector 20, and they are simultaneously hot-pressed together from the top and bottom, there is a different drying speed of a solvent between the surface of the positive active material layer 16 contacting the current collector 20 and the other surface thereof contacting air, preventing a crack thereon. In addition, when the current collector 20 is a net, it may have a decreased thickness, improving adherence to the positive active material layer 16 and thus battery performance.

The negative electrode 112 includes a negative active material layer on the negative current collector (not shown). The negative current collector may be a polymer substrate coated with at least one of a copper film, a nickel film, a stainless steel film, a titanium film, a nickel foam, and a conductive metal, or a mesh-like net made of the metal, but is not limited thereto. The negative active material layer includes a binder and optionally a conductive material.

The negative active material includes a material that reversibly intercalates/deintercalates lithium ions, a lithium metal, a lithium metal alloy, a material capable of being doped with lithium, or a transition metal oxide. The material that reversibly intercalates/deintercalates lithium ions includes carbon materials. The carbon materials may be any generally-used carbon-based negative active material for a lithium ion rechargeable battery. Examples of the carbon material include crystalline carbon, amorphous carbon, and a mixture thereof. The crystalline carbon may be a sheet, a flake, a sphere, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and the like.

Examples of the lithium metal alloy include an alloy of lithium and a metal selected from Na, K, Rb, Cs, Fr, Be, Mg, Ca, Sr, Ba, Ra, Ti, Ag, Zn, Cd, Al, Ga, In, Si, Ge, Sn, Pb, Sb, Bi, and a combination thereof. Examples of the material capable of being doped with lithium include Si, $SiO_x$ (0<x<2), Sn, $SnO_2$, a tin alloy composite, and a combination thereof. Examples of the transition metal oxide include vanadium oxide, lithium vanadium oxide, and the like. The binder and the conductive material are the same as aforementioned.

The separator 113 may be a single layer or multilayer and made of, for example, polyethylene, polypropylene, polyvinylidene fluoride, and a combination thereof.

The electrolyte includes a non-aqueous organic solvent and a lithium salt. The non-aqueous organic solvent functions as a medium for transmitting ions taking part in the electrochemical reaction of a battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (methyl ethyl carbonate, EMC or MEC), ethylene carbonate (EC), propylene carbonate (PC), butylene carbonate (BC), and the like.

Particularly, when the carbonate-based solvent is used a mixture of a cyclic carbonate and a linear carbonate, a solvent having a high dielectric constant and low viscosity may be provided. The cyclic carbonate and the chain carbonate are mixed together in the volume ratio of about 1:1 to about 1:9.

Examples of the ester-based solvent may include methyl acetate, ethyl acetate, n-propyl acetate, dimethyl acetate, methylpropionate, ethylpropionate, γ-butyrolactone, 5-decanolide, γ-valerolactone, d,l-mevalonolactone, γ-caprolactone, and so on. Examples of the ether-based solvent include dibutyl ether, tetraglyme, diglyme, 1,2-dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on.

The non-aqueous organic solvent may be used singularly or in a mixture. When the organic solvent is used in a mixture, the mixture ratio can be controlled in accordance with a desirable battery performance. The non-aqueous electrolyte may further include an overcharge-inhibiting compound such as ethylene carbonate, pyrocarbonate, and the like.

Hereinafter, the embodiments are illustrated in more detail with reference to examples. However, the following are exemplary embodiments and are not limiting. Furthermore, what is not described in this specification can be sufficiently understood by those who have knowledge in this field and will not be illustrated here.

EXAMPLES

Fabrication of Positive Electrode

Example 1

85 wt % of $LiMn_2O_4$ as a positive active material, 10 wt % of polyvinylidene fluoride and polyvinyl acetate as a binder, and 5 wt % of carbon black as a conductive material were mixed together. The mixture was dispersed into N-methyl-2-pyrrolidone, preparing a composition for forming a positive active material layer. Herein, the binder was prepared by mixing 90 wt % of a first binder and 10 wt % of a second binder.

Then, the composition for forming a positive active material layer was coated on a glass plate to form a positive active material layer. Next, the positive active material layer was disposed on both sides of a 20 μm-thick aluminum net-type current collector and then hot-pressed at 150° C. with a presser, fabricating a positive electrode with an electrical conduction network. Herein, the positive electrode was 400 μm thick before the hot-pressure and 200 μm thick after the hot-pressure.

Example 2

85 wt % of $LiMn_2O_4$ as a positive active material, 10 wt % of polyvinylidene fluoride as a binder, and 5 wt % of carbon black as a conductive material were mixed together. The mixture was dispersed into N-methyl-2-pyrrolidone, preparing a composition for a positive active material layer.

The composition for forming a positive active material layer was coated on a glass plate to form a positive active material layer. The positive active material layer was disposed on both sides of a net-type 20 μm-thick aluminum current collector and pressed at 150° C. with a hot-presser, fabricating a positive electrode with an appropriate electrical conduction network. Herein, the positive electrode was 400 μm thick before the hot-pressure and 200 μm thick after the hot-pressure.

Comparative Example 1

85 wt % of $LiMn_2O_4$ as a positive active material, 10 wt % of polyvinylidene fluoride and polyvinyl acetate as a binder, and 5 wt % of carbon black as a conductive material were mixed together. The mixture was dispersed into N-methyl-2-pyrrolidone, preparing a composition for forming a positive active material layer. Herein, the binder included 90 wt of a first binder and 10 wt % of a second binder.

The composition for forming a positive active material layer was coated on an aluminum current collector, forming a positive active material layer. The positive active material layer was coated on a 20 μm-thick aluminum foil and then dried at 120° C. for 1 hour. The dried positive electrode was compressed, fabricating a positive electrode with an electrical conduction network. Herein, the positive electrode was 400 μm thick before the compression but 200 μm thick after the compression.

<Fabrication of Rechargeable Lithium Battery Cells>

Rechargeable lithium battery cells respectively including the positive electrodes according to Examples 1 and 2 and Comparative Example 1 were fabricated by the following method to evaluate their electrochemical characteristics.

The positive electrodes according to Examples 1 and 2 and Comparative Example 1 were respectively used. As for their counter electrodes, metallic lithium was used to fabricate a coin-type half-cell. Herein, an electrolyte solution was prepared by dissolving $LiPF_6$ in a concentration of 1.3 M in a mixed solution of ethylene carbonate (EC) and dimethylcarbonate (DMC) mixed in a volume ratio of 3:7.

Experimental Example 1

Electrochemical Characteristic Evaluation of the Rechargeable Lithium Battery Cells The rechargeable lithium battery cells fabricated according to Examples 1 and 2 and Comparative Example 1 were charged and discharged at a 0.1 C rate in a potential region ranging from 3.0 to 4.3 V in order to evaluate the characteristics. The results are shown in FIG. 5, a graph showing charge and discharge characteristics of half-cells according to Examples 1 and 2 and Comparative Example 1.

Figure 5:
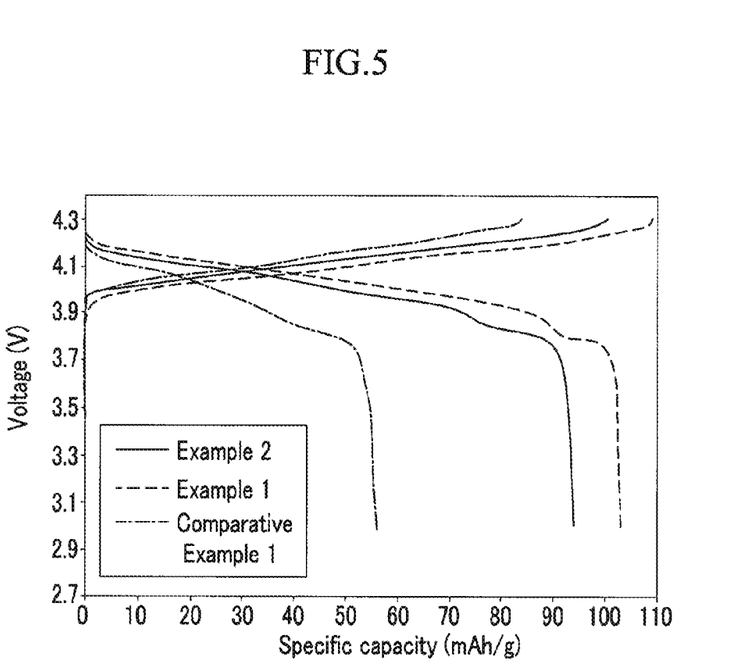
FIG. 5 is a graph showing charge and discharge characteristics of half-cells according to Examples 1 and 2 and Comparative Example 1.

Referring to FIG. 5, the half-cell of Example 1 had discharge capacity of about 103.3 mAh/g, the one of Example 2 had discharge capacity of about 93.8 mAh/g, and the one of Comparative Example 1 had discharge capacity of about 55.7 mAh/g, which shows that a battery cell including a positive electrode fabricated by hot-pressing a net-type current collector had large capacity.

In addition, the half-cells according to Examples 1 and 2 turned out to have higher discharge potential than the one of Comparative Example 1 in a discharge curved line, which shows that the positive electrode fabricated by using a net-type current collector and hot-pressing it had excellent electrical conductivity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive electrode for a rechargeable lithium battery, comprising:
   a mesh-like current collector; and
   a positive active material layer formed on both sides of the current collector and comprising a positive active material and a binder, wherein the positive active material consists of an active material selected from the group consisting of $LiCoO_2$, $LiMn_2O_4$, $LiFePO_4$, and combinations thereof, and wherein the binder comprises a first binder selected from the group consisting of polyvinylidene fluoride, a polyvinylidene fluoride-hexafluoropropylene copolymer, a polyvinylidene fluoride-trifluoroethylene phosphate copolymer, and combinations thereof, and a second binder selected from the group consisting of polyvinyl acetate, polymethylmethacrylate, a polymethylmethacrylate-ethylmethacrylate copolymer, a polymethylmethacrylate-butylmethacrylate copolymer, polyethylene oxide, polyethylene glycol-grafted polymethylmethacrylate, polyvinyl chloride, a polyvinyl chloride-methylmethacrylate copolymer, and combinations thereof, wherein the positive electrode has a thickness of about 150 μm or more.

2. The positive electrode of claim 1, wherein the current collector is aluminum.

3. The positive electrode of claim 1, wherein the positive active material layer comprises about 80 to about 95 wt % of the positive active material and about 5 to about 20 wt % of the binder.

4. The positive electrode of claim 1, wherein the first binder comprises polyvinylidene fluoride, and the second binder is selected from the group consisting of polyvinyl acetate, polymethylmethacrylate, polyethylene oxide, polyvinyl chloride, and copolymers thereof.

5. The positive electrode of claim 1, wherein the first binder is polyvinylidene fluoride-hexafluoropropylene copolymer comprising about 4 to about 20 wt % of hexafluoropropylene.

6. The positive electrode of claim 1, wherein the binder comprises about 50 to about 99 wt % of the first binder and about 1 to about 50 wt % of the second binder.

7. The positive electrode of claim 1, wherein the positive active material layer further comprises a conductive material.

8. The positive electrode of claim 7, wherein the positive active material layer comprises about 65 to about 85 wt % of the positive active material, about 5 to about 20 wt % of the binder, and about 5 to about 10 wt % of the conductive material.

9. The positive electrode of claim 1, wherein the positive electrode is about 150 to about 2000 μm thick.

10. The positive electrode of claim 1, wherein the positive electrode is about 150 to about 1000 μm thick.

11. The positive electrode of claim 1, wherein the positive electrode has an average porosity of about 30 volume % or more.

12. A method of manufacturing the positive electrode of claim 1 for a rechargeable lithium battery, comprising:
preparing a positive active material composition comprising a positive active material and a binder;
coating the positive active material composition on a substrate to prepare a positive active material layer;
disposing the positive active material layer on both sides of a net-type current collector; and
hot-pressing the positive active material layer and the current collector at least one time to form positive active material layers on each side of the current collector,
wherein the positive electrode is about 150 μm thick or more.

13. A rechargeable lithium battery comprising:
a positive electrode;
a negative electrode; and
a separator disposed between the positive and negative electrodes,
wherein the positive electrode comprises:
a mesh-like current collector and a positive active material layer formed on both sides of the current collector,
the positive active material layer comprises a positive active material and a binder, wherein the positive active material consists of an active material selected from the group consisting of $LiCoO_2$, $LiMn_2O_4$, $LiFePO_4$, and combinations thereof, and wherein the binder comprises a first binder selected from the group consisting of polyvinylidene fluoride, a polyvinylidene fluoride-hexafluoropropylene copolymer, a polyvinylidene fluoride-trifluoroethylene phosphate copolymer, and combinations thereof, and a second binder selected from the group consisting of polyvinyl acetate, polymethylmethacrylate, a polymethylmethacrylate-ethylmethacrylate copolymer, a polymethylmethacrylate-butylmethacrylate copolymer, polyethylene oxide, polyethylene glycol-grafted polymethylmethacrylate, polyvinyl chloride, a polyvinyl chloride-methylmethacrylate copolymer, and combinations thereof, and
the positive electrode is about 150 μm thick or more.

14. The rechargeable lithium battery of claim 13, wherein the current collector is aluminum.

15. The rechargeable lithium battery of claim 13, wherein the positive active material layer comprises about 80 to about 95 wt % of the positive active material and about 5 to about 20 wt % of the binder.

16. The rechargeable lithium battery of claim 13, wherein the first binder comprises polyvinylidene fluoride, and the second binder is selected from the group consisting of polyvinyl acetate, polymethylmethacrylate, polyethylene oxide, polyvinyl chloride, and copolymers thereof.

17. The rechargeable lithium battery of claim 13, wherein the first binder is polyvinylidene fluoride-hexafluoropropylene copolymer comprising about 4 to about 20 wt % of hexafluoropropylene.

18. The rechargeable lithium battery of claim 13, wherein the binder comprises about 50 to about 99 wt % of the first binder and about 1 to about 50 wt % of the second binder.

19. The rechargeable lithium battery of claim 13, wherein the positive active material layer further comprises a conductive material.

20. The rechargeable lithium battery of claim 19, wherein the positive active material layer comprises about 65 to about 85 wt % of the positive active material, about 5 to about 20 wt % of the binder, and about 5 to about 10 wt % of the conductive material.

21. The rechargeable lithium battery of claim 13, wherein the positive electrode has a thickness ranging from about 150 to about 2000 μm.

22. The rechargeable lithium battery of claim 13, wherein the positive electrode has a thickness ranging from about 150 to about 1000 μm.

23. The rechargeable lithium battery of claim 13, wherein the positive electrode has an average porosity of about 30 volume % or more.

* * * * *